United States Patent
Zhou

(10) Patent No.: US 11,736,163 B2
(45) Date of Patent: Aug. 22, 2023

(54) METHOD AND DEVICE FOR CONTROLLING CHANNEL SELECTOR SWITCH AND STORAGE

(71) Applicant: BEIJING XIAOMI MOBILE SOFTWARE CO., LTD., Beijing (CN)

(72) Inventor: Haigang Zhou, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 64 days.

(21) Appl. No.: 17/334,525

(22) Filed: May 28, 2021

(65) Prior Publication Data
US 2022/0209835 A1 Jun. 30, 2022

(30) Foreign Application Priority Data
Dec. 28, 2020 (CN) .......................... 202011578072.6

(51) Int. Cl.
*H04W 4/00* (2018.01)
*H04B 7/06* (2006.01)
*H04W 76/28* (2018.01)
*H04L 5/00* (2006.01)
*H04W 72/0453* (2023.01)

(52) U.S. Cl.
CPC ......... *H04B 7/0608* (2013.01); *H04L 5/0098* (2013.01); *H04W 72/0453* (2013.01); *H04W 76/28* (2018.02)

(58) Field of Classification Search
CPC .............. H04B 7/0508; H04L 5/0098; H04W 72/0453; H04W 76/28
See application file for complete search history.

(56) References Cited

U.S. PATENT DOCUMENTS

| 10,673,514 B1* | 6/2020 | Klomsdorf ............... H04B 1/18 |
| 2006/0125708 A1* | 6/2006 | Narita .................. H04B 7/0608 343/876 |
| 2012/0093039 A1 | 4/2012 | Rofougaran et al. |

(Continued)

FOREIGN PATENT DOCUMENTS

| CN | 201409132 Y | 2/2010 |
| CN | 111224711 A | 6/2020 |

(Continued)

OTHER PUBLICATIONS

First Office Action of the Chinese Application No. 202011578072.6, dated Nov. 16, 2021, (16 pages).

(Continued)

*Primary Examiner* — Chi H Pham
*Assistant Examiner* — Elisabeth Benoit Magloire
(74) *Attorney, Agent, or Firm* — Arch & Lake LLP

(57) ABSTRACT

A method and a device for controlling a channel selector switch and a storage medium are provided. The method for controlling the channel selector switch is applied to a terminal having at least two radio frequency channels; and the at least two radio frequency channels share the channel selector switch. The method includes: determining a state of each of a first RF channel and a second RF channel that share a same channel selector switch; and maintaining, in response to that the first RF channel is to enter a dormant state and the second RF channel is in an activated state, an active state of the channel selector switch.

18 Claims, 11 Drawing Sheets

---

S110: A state of each of a first RF channel and a second RF channel that share a same channel selector switch is determined

↓

S121: In response to that the first RF channel is to enter the dormant state and the second RF channel is in the activated state, whether the channel selector switch is occupied by the second RF channel of the at least two RF channels is determined

↓

S122: When the channel selector switch is occupied by the second RF channel, the active state of the channel selector switch is maintained

(56) References Cited

U.S. PATENT DOCUMENTS

| | | |
|---|---|---|
| 2016/0309416 A1 | 10/2016 | Gao |
| 2016/0316378 A1 | 10/2016 | Su et al. |
| 2017/0257807 A1* | 9/2017 | Zacharias ............ H04W 76/28 |
| 2018/0007600 A1* | 1/2018 | Gopal ................. H04B 7/0404 |
| 2018/0331714 A1* | 11/2018 | See ..................... H04B 7/0814 |
| 2021/0112399 A1* | 4/2021 | Gopal .................... H04L 5/008 |
| 2021/0136618 A1* | 5/2021 | Liu .................... H04W 72/044 |
| 2022/0377662 A1* | 11/2022 | Sun ....................... H04W 24/10 |
| 2022/0416867 A1* | 12/2022 | Abotabl .............. H04B 7/0632 |

FOREIGN PATENT DOCUMENTS

| | | |
|---|---|---|
| CN | 210986100 U | 7/2020 |
| CN | 111970021 A | 11/2020 |
| CN | 111970022 A | 11/2020 |

OTHER PUBLICATIONS

European Search Report in the European Application No. 21176725.6, dated Nov. 19, 2021, (10 pages).

Dish Network, "Considerations on switched single UL/dual UL transmission in LTE-NR", 3GPP TSG-RAN WG4 Meeting #NR-AH3 R4-1709683 Nagoya, Japan, Sep. 18-21, 2017, (4 pages).

\* cited by examiner

METHOD AND DEVICE FOR CONTROLLING CHANNEL SELECTOR SWITCH AND STORAGE

CROSS-REFERENCE TO RELATED APPLICATION

The Application claims the benefit of priority to Chinese Patent Application 202011578072.6, filed on Dec. 28, 2020, the disclosure of which is incorporated herein by reference in its entirety for all purposes.

BACKGROUND

As the very important communication component in the communication device, the Radio Frequency (RF) system is provided with a great number of shared channel selector switches for the sake of cost reduction. In the dual connectivity and multi-connectivity scenarios that support different communication systems, some communication systems will enter the dormant state for saving the power consumption of the terminal. For example, the discontinuous reception (DRX) in the dual connectivity scenario is configured with a DRX cycle; and accordingly, the corresponding RF channel enters the dormant state periodically according to the DRX cycle. However, it is found by researches that when one RF channel enters the dormant state, the communication quality of another RF channel will be affected.

SUMMARY

The disclosure relates to the technical field of wireless communications, and more particularly, to a method and a device for controlling a channel selector switch and a storage medium.

According to a first aspect of the disclosure, a method for controlling a channel selector switch is provided. The method is applied to a terminal having a first RF channel and a second RF channel, where the first and second RF channels share a channel selector switch. The method includes: determining a state of each of the first RF channel and the second RF channel that share a same channel selector switch; and maintaining, in response to that the first RF channel is to enter a dormant state and the second RF channel is in an activated state, an active state of the channel selector switch.

According to a second aspect of the disclosure, a device for controlling a channel selector switch is provided. The device is applied to a terminal having a first RF channel and a second RF channel, where the first and second RF channels share a channel selector switch. The device includes a processor configured to determine a state of each of a first RF channel and a second RF channel that share a same channel selector switch. The processor is further configured to maintain, in response to that the first RF channel is to enter a dormant state and the second RF channel is in an activated state, an active state of the channel selector switch.

According to a third aspect of the disclosure, there is provided a non-transitory computer-readable storage medium having stored thereon instructions that when executed by a processor of a computer, cause the computer to perform a method for controlling the channel selector switch, the method including: determining a state of each of a first RF channel and a second RF channel that share a same channel selector switch; and maintaining, in response to that the first RF channel is to enter a dormant state and the second RF channel is in an activated state, an active state of the channel selector switch.

BRIEF DESCRIPTION OF THE DRAWINGS

The accompanying drawings, which are incorporated in and form a part of this specification, illustrate embodiments consistent with the disclosure and, together with the specification, serve to explain the principles of the disclosure.

DETAILED DESCRIPTION

Here, embodiments are described in detail, examples of which are illustrated in the accompanying drawings. In the following description related to the accompanying drawings, the same numbers in different drawings represent the same or similar elements unless otherwise represented. The implementations described in the following embodiments do not represent all the implementations consistent with the disclosure. Instead, they are merely examples of the device consistent with some aspects of the disclosure and the appended claims.

Figure 1:
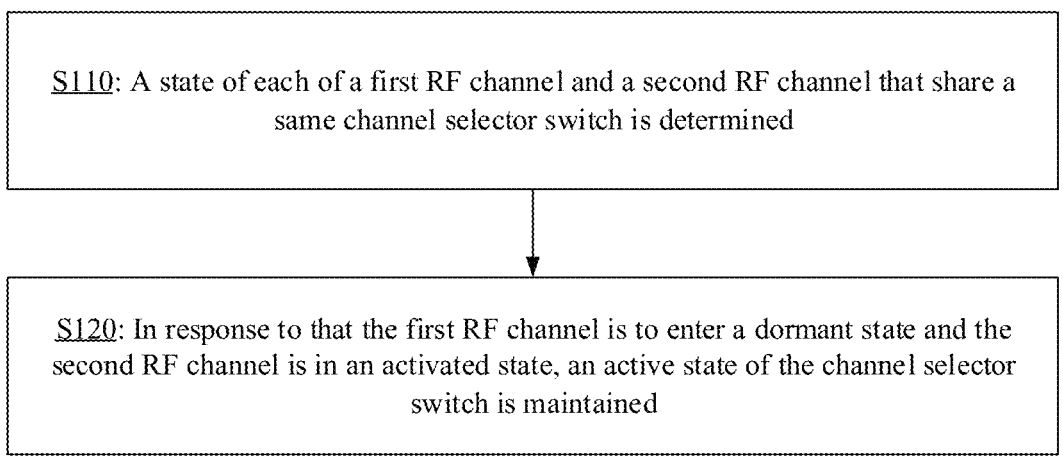
FIG. 1 is a flow chart illustrating a method for controlling a channel selector switch according to at least some embodiments.

A embodiment of the disclosure provides a method for controlling a channel selector switch. The method is applied to a terminal having at least two RF channels. The at least two RF channels share a channel selector switch. As illustrated in FIG. 1, the method for controlling the channel selector switch includes steps S110 and S120.

In S110, a state of each of a first RF channel and a second RF channel that share a same channel selector switch is determined.

In S120, in response to that the first RF channel is to enter a dormant state and the second RF channel is in an activated state, an active state of the channel selector switch is maintained.

In the embodiment of the disclosure, the terminal may include but is not limited to: a mobile phone, a tablet or a wearable device or the like.

In the embodiment of the disclosure, different RF channels support different communication systems, i.e., different RF channels are used for wireless communications of different communication systems. For example, some RF channels support the LTE communication, and some RF channels support the NR communication. The LTE communication and the NR communication belong to different communication systems.

Different communication systems may have different DRX cycles. One DRX cycle includes: a dormant period corresponding to the dormant state and an activated period corresponding to the activated state. When the present moment is in the dormant period of the DRX cycle of a communication system, the RF channel which supports the communication system needs to enter the dormant state. When the present moment is in the activated period of the DRX cycle of the communication system, the RF channel which supports the communication system enters the activated state. The RF channel in the activated state may work, i.e., may perform the work such as signal reception and transmission. The RF channel in the dormant state cannot work, i.e., cannot perform the work such as signal reception and transmission.

In consideration of the hardware cost and the thinness of the terminal, at least two RF channels may share the same channel selector switch. The channel selector switch may include but is not limited to a 3P3T switch. In some embodiments, the channel selector switch may further include: a double-pole double-throw switch. In the embodiment of the disclosure, the channel selector switch is a switching circuit composed of a variety of electronic components. The on-off state of the channel selector switch may be controlled by inputting an electrical signal, thereby controlling the RF channel turned on by the channel selector switch.

In an embodiment, the channel selector switch may include: a P port and a T port. The P port may be a port where the movable contact is located, and the T port may be a port where a static contact is located. The switching circuit is arranged between the P port and the T port. The switching circuit may include one or more metal oxide semiconductor (MOS) transistor and/or unidirectional conductive tube (for example, including but not limited to a diode). Through introducing a control signal, the corresponding P port and T port may be connected or disconnected.

In the embodiment of the disclosure, the channel selector switch may be a controlled switch connected between a radiator of an antenna and a power amplifier.

The technical solutions provided in the embodiments of the disclosure may have the following beneficial effects.

According to the technical solutions provided in the embodiments of the disclosure, when one of at least two RF channels sharing the same channel selector switch enters the dormant state, the shared channel selector switch does not directly enter the dormant state according to the RF channel which enters the dormant state; instead, the active state of the channel selector switch is maintained with the consideration that the other RF channel is in the activated state. That is, the channel selector switch may still maintain a workable state, and may provide a turned on link for the reception and transmission of an RF signal in the other RF channel, thereby ensuring the communication quality of the other RF channel, and improving the throughput of data reception and transmission of the other RF channel.

Figure 2:
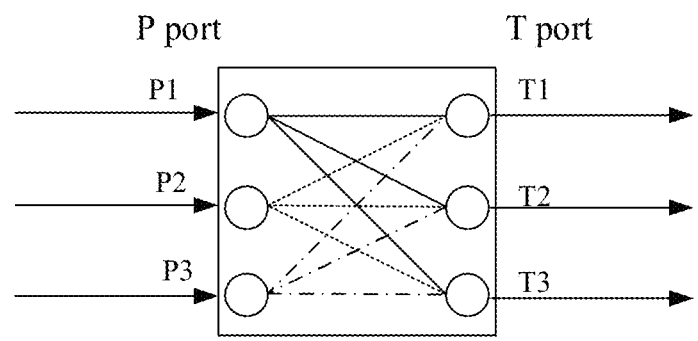
FIG. 2 is a schematic diagram illustrating a 3 Pole 3 Throw (3P3T) switch according to at least some embodiments.

FIG. 2 shows a 3P3T switch. The 3P3T switch includes a P port and a T port. The P port includes P1, P2 and P3 respectively. The T port also includes T1, T2 and T3. In the embodiment of the disclosure, for the first RF channel and the second RF channel which are connected to the same channel selector switch, when the first RF channel enters the dormant state, the channel selector switch does not directly enter the dormant state, either. When the channel selector switch enters the dormant state, the channel selector switch does not work, resulting in that the second RF channel connected to the channel selector switch cannot work either and thus the second RF channel has poor communication quality and/or small throughput. In view of this, in the embodiment of the disclosure, when the first RF channel enters the dormant state, whether the channel selector switch is occupied by the second RF channel is determined. When the channel selector switch is occupied by the second RF channel, the active state of the channel selector switch is maintained. Hence, the channel selector switch is maintained continuously in a working mode, and provides continuously a turned on RF path for the wireless communication of the second RF channel.

Figure 3:
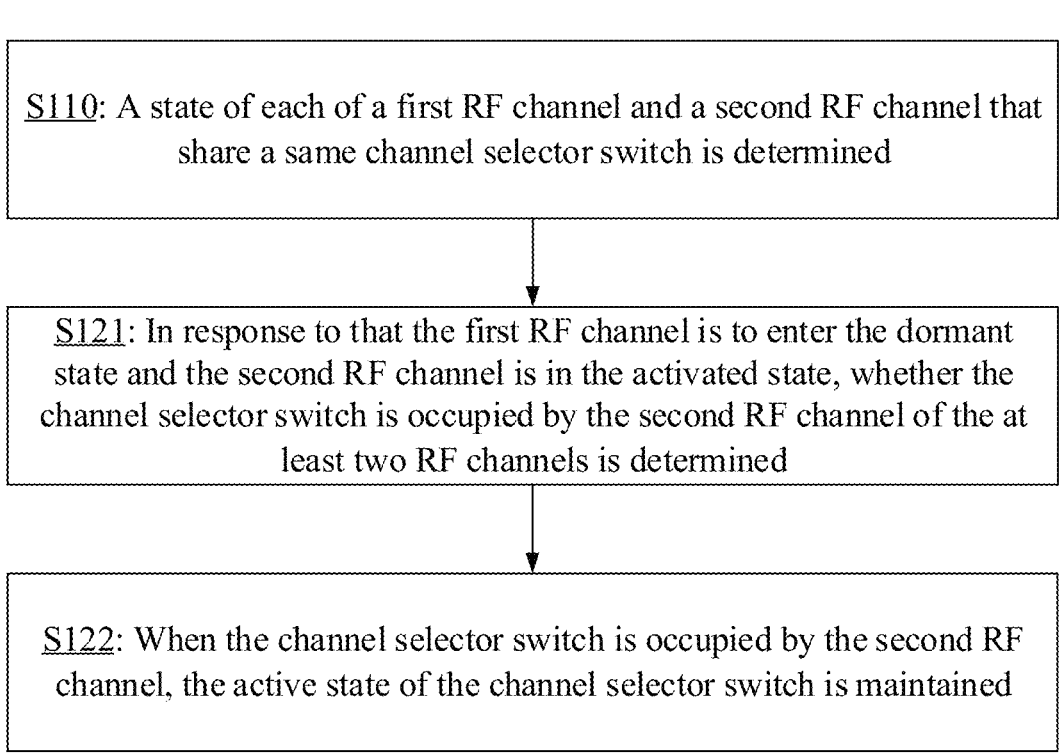
FIG. 3 is a flow chart illustrating a method for controlling a channel selector switch according to at least some embodiments.

In an embodiment, as illustrated in FIG. 3, S120 may include steps S121 to S122.

In S121, in response to that the first RF channel is to enter the dormant state and the second RF channel is in the activated state, whether the channel selector switch is occupied by the second RF channel of the at least two RF channels is determined.

In S122, when the channel selector switch is occupied by the second RF channel, the active state of the channel selector switch is maintained.

In the embodiment of the disclosure, when the second RF channel is maintained in the activated state, whether the second RF channel occupies the channel selector switch is further determined, i.e., whether the channel selector switch is in a usage state is further determined; and when the channel selector switch is in the usage state, the active state of the channel selector switch is maintained.

In another embodiment, when the second RF is in the activated state but does not occupy the channel selector switch, the channel selector switch may enter the dormant state with the other components in the first RF channel, so as to save the power consumption of the terminal as much as possible.

In an embodiment, the method may further include:

when the first RF channel sharing the channel selector switch is to enter the dormant state, and the second RF channel already enters the dormant state or is also to enter the dormant state, the channel selector switch together with the other components in the first RF channel are controlled to enter the dormant state.

In this way, the power consumption of the terminal may be saved as much as possible, and the standby time of the terminal may be prolonged.

Figure 4:
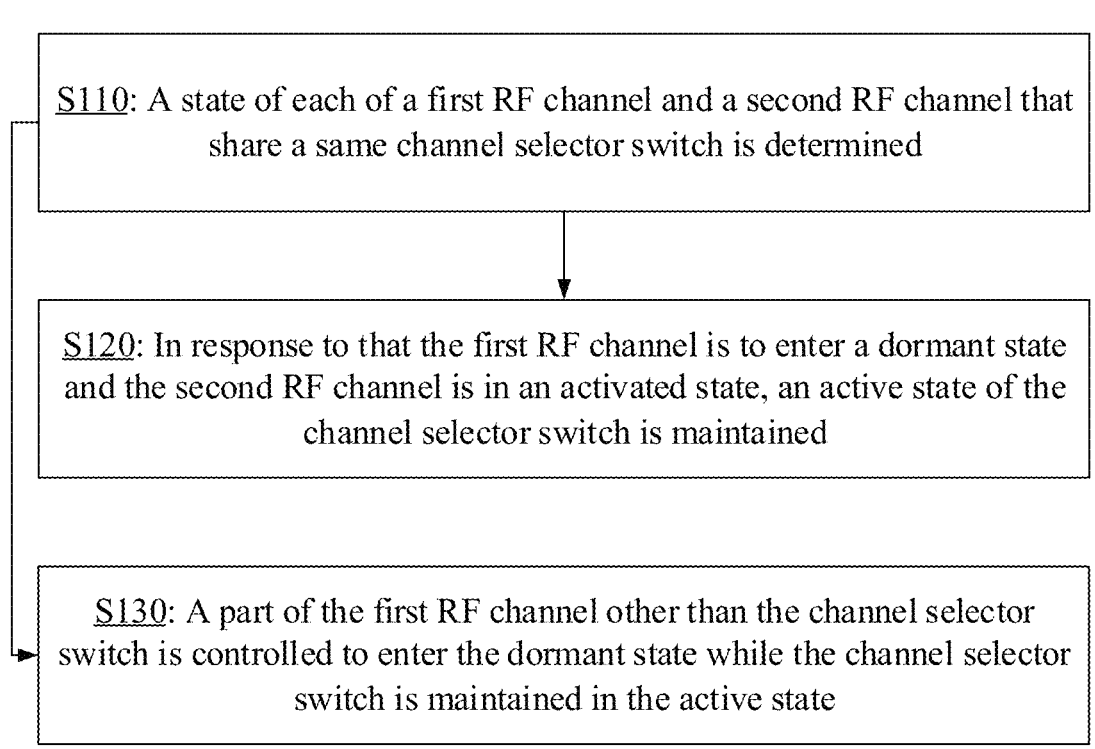
FIG. 4 is a flow chart illustrating a method for controlling a channel selector switch according to at least some embodiments.

In an embodiment, as illustrated in FIG. 4, the method may further include step S130.

In S130, a part of the first RF channel other than the channel selector switch is controlled to enter the dormant state when the channel selector switch is maintained in the active state.

There are a variety of electronic devices in one RF channel, for example, including but not limited to: an antenna, a filter, a power coupler, a power amplifier (PA), a low noise amplifier (LNA), etc. When the channel selector switch is maintained in the active state, the other parts except the channel selector switch in the first RF channel are controlled to enter the dormant state. In this way, at least a part of the components in the first RF channel in the terminal is dormant in one aspect, thereby saving the power consumption of the terminal; and in another aspect, as the channel selector switch is maintained in the active state, the second RF channel in the activated state may continuously use the channel selector switch to receive and transmit the RF signal.

In an embodiment, the method may further include:

maintaining an on-off state of the channel selector switch when the active state of the channel selector switch is maintained.

The channel selector switch has different on-off states. Under the different on-off states, the channel selector switch turns on different RF links in the corresponding RF channel.

In the embodiment of the disclosure, the present on-off state of the channel selector switch may be determined independently based on the communication requirement for the first RF channel, and alternatively, may be determined synthetically based on the communication requirements for the first RF channel and the second RF channel. In any case, when the channel selector switch is in the active state, at least one RF circuit in the second RF channel is turned on; and when the present on-off state of the channel selector switch is maintained, at least one RF circuit in the second RF channel may be at least maintained to receive and transmit the RF signal.

In another embodiment, the present on-off state of the channel selector switch may be determined independently based on the communication requirement for the first RF channel, and alternatively, may be determined synthetically based on the communication requirements for the first RF channel and the second RF channel. The present on-off state may not be an optimal on-off state that meets the communication requirement for the second RF channel. Hence, in the embodiment of the disclosure, in order to further improve the communication quality of the second RF channel, the on-off state of the channel selector switch which is in the active state at present is adjusted or maintained according to the communication requirement for the second RF channel. That is, the method may further include:

controlling an on-off state of the channel selector switch according to a communication requirement for the second RF channel while maintaining the active state of the channel selector switch.

In this way, after the first RF channel enters the dormant state, the on-off state of the channel selector switch is controlled independently according to the communication requirement for the second RF channel, such that the channel selector switch enters an on-off state matching the communication requirement for the second RF channel, thereby ensuring the communication quality of the second RF channel.

In at least some embodiments, controlling the on-off state of the channel selector switch according to the communication requirement for the second RF channel while maintaining the active state of the channel selector switch includes:

acquiring a first logic value while maintaining the active state of the channel selector switch, wherein the first logic value is determined according to a communication requirement for an RF channel to which a second antenna group connected to the channel selector switch belongs; and controlling the on-off state of the channel selector switch according to the first logic value after the first RF channel enters the dormant state.

In the embodiment of the disclosure, the first logic value may be a control logic value for controlling the channel selector switch. Therefore, after the control logic value is acquired, and after the first RF channel enters the dormant state, the on-off state of the channel selector switch is switched according to the first logic value, such that the on-off state of the channel selector switch meets the communication requirement for the second RF channel.

In an embodiment, either of the at least two RF channels has a first antenna group and a second antenna group; here, the second antenna group is an auxiliary antenna group for the first antenna group; and a first antenna group in any RF channel of the at least two RF channels and a second antenna group in other RF channel of the at least two RF channels share one channel selector switch.

In an embodiment, when one RF channel is in the activated state, it is at least ensured that the RF circuit connected to one antenna in the RF channel is in a turned on state and may receive and transmit a signal.

In an embodiment, each of the first antenna group and the second antenna group at least include one antenna. In at least some embodiments, each of the first antenna group and the second antenna group only include two antennas.

For example, the first antenna group includes: a first antenna and a second antenna. The first antenna is a primary antenna (TRX), and the second antenna may be a diversity antenna (DRX). In another example, the second antenna group includes: a third antenna and a fourth antenna. The third antenna may be a primary multiple input multiple output (MIMO) antenna (i.e., PRM). The fourth antenna may be a diversity MIMO antenna, i.e., DRM.

In at least some embodiments, the first antenna in one RF channel and the third antenna in the other RF channel are connected to the same P port of the channel selector switch; and the second antenna in one RF channel and the fourth antenna in the other RF channel are connected to the same P port of the channel selector switch. The first antenna and the second antenna in the first antenna group in the same RF channel are connected to different P ports of the channel selector switch.

In at least some embodiments, when the channel selector switch includes multiple P ports and multiple T ports, each P port may be connected to each T port.

In this case, the first antenna and the second antenna in any RF channel, and the third antenna and the fourth antenna in the other RF channel share one channel selector switch.

In an embodiment, the method further includes:

controlling, in response to that both RF channels sharing the same channel selector switch are in the activated state, the on-off state of the channel selector switch according to a communication requirement for an RF channel to which the first antenna group connected to the channel selector switch belongs.

That is, for two RF channels sharing the same channel selector switch, a control logic for the channel selector switch, used by the RF channel to connect the second antenna group to the channel selector switch, follows the RF channel which connects the first antenna group to the channel selector switch. In this way, the working state of the first antenna group for connecting the first antenna group to the channel selector switch is at least ensured. Since at least one antenna in the first antenna group needs to be in the working state, the channel selector switch turns on at least one RF link, and therefore, at least one antenna in the second antenna group in the other RF channel would be in the turned on state due to the turned on RF link.

The first antenna group includes the first antenna and the second antenna. When the first antenna which serves as the primary antenna has a high transmission gain, the diversity antenna may be in a non-working state, and the RF link connected to the first antenna may be in the working state through controlling the on-off state of the channel selector switch. For the RF link connected to the second antenna, the RF link connected to the second antenna may be in the non-working state through controlling the on-off state of the channel selector switch, so as to save unnecessary power consumption. In this case, in the second antenna group in the other RF channel, the RF link connected to the antenna in the second antenna group which is connected to the same port of the channel selector switch with the corresponding first antenna is also turned on, and the RF link connected to the antenna in the second antenna group which is connected to the same port of the channel selector switch with the corresponding second antenna is also turned off.

When the receiving power or transmitting power of the first antenna does not meet the communication requirement, both the first antenna and the second antenna in the first antenna group in one RF channel may enter the working state. In this case, both ports of the channel selector switch connected to the first antenna and the second antenna are closed, and both RF links connected to the first antenna and the second antenna are turned on. Since both RF links connected to the first antenna and the second antenna are turned on, both RF links connected to the third antenna and the fourth antenna in the second antenna group in the other RF channel are also turned on.

Controlling, in response to that both RF channels sharing the same channel selector switch are in the activated state, the on-off state of the channel selector switch according to the communication requirement for the RF channel to which the first antenna group connected to the channel selector switch belongs includes:

acquiring a second logic value, where the second logic value is determined according to the communication requirement for the RF channel to which the first antenna group connected to the channel selector switch belongs; and controlling the on-off state of the channel selector switch according to the second logic value.

In the embodiment of the disclosure, both the second logic value and the first logic value may be control logic values for controlling the channel selector switch.

In an embodiment, the channel selector switch is provided with a control module. The control module may include a control circuit or a processor. The control circuit inputs a control signal such as a voltage or a current to a control port of the channel selector switch according to the control logic value, thereby controlling the on-off state of the channel selector switch.

In at least some embodiments, the channel selector switch includes one or more MOS transistors. When a certain voltage is applied between the gate and the source of the MOS transistor, the drain and the source of the corresponding MOS tube are turned on. In this case, the corresponding RF link may be turned on or turned off through controlling the voltage on the gate.

In an embodiment, before the first RF channel enters the dormant state, the control logic value of the channel selector switch is determined according to the communication requirement for the first RF channel. Meanwhile, the mobile terminal may generate the first logic value and the second logic value synchronously according to the communication requirements for the first RF channel and the second RF channel. After the first logic value and the second logic value are generated, the on-off state of the channel selector switch is controlled according to the second logic value, and the first logic value is stored. After the first RF channel enters the dormant state, the on-off state of the channel selector switch is switched according to the stored first logic value.

In some embodiments, when the first RF channel is in the activated state, the first logic value may not be generated or may be invalid after generated. To sum up, the on-off state of the channel selector switch is controlled merely according to the second logic value. However, in an embodiment, the first logic value is generated and stored; and when the first RF channel corresponding to the second logic value enters the dormant state, the on-off state of the channel selector switch may certainly be controlled according to the second logic value, or the on-off state of the channel selector switch may be controlled according to the first logic value, such that the on-off state of the channel selector switch is more matched with the communication requirement for the second RF channel.

In an embodiment, when the first RF channel is an RF channel which supports LTE communication, the second RF channel is an RF channel which supports NR communication; or when the first RF channel is the RF channel which supports the NR communication, the second RF channel is the RF channel which supports the LTE communication.

In an embodiment, the first antenna group in the RF channel of the LTE and the second antenna group in the RF channel of the NR share a first switch; and the first antenna group in the RF channel of the NR and the second antenna group in the RF channel of the LTE share a second switch.

Figure 6:
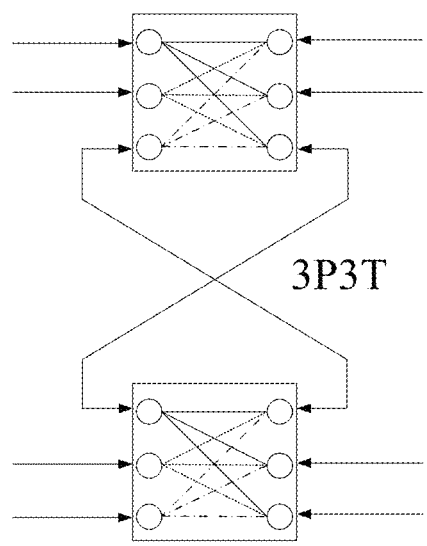
FIG. 6 is a schematic diagram of connection between two channel selector switches according to at least some embodiments.

In an embodiment, a P port of the first switch is connected to a T port of the second switch; and a P port of the second switch is connected to a T port of the first switch. FIG. 6 shows a 3P3T switch as the channel selector switch. Any P port of the 3P3T switch is connected to three T ports, and any T port is connected to three P ports.

Figure 5:
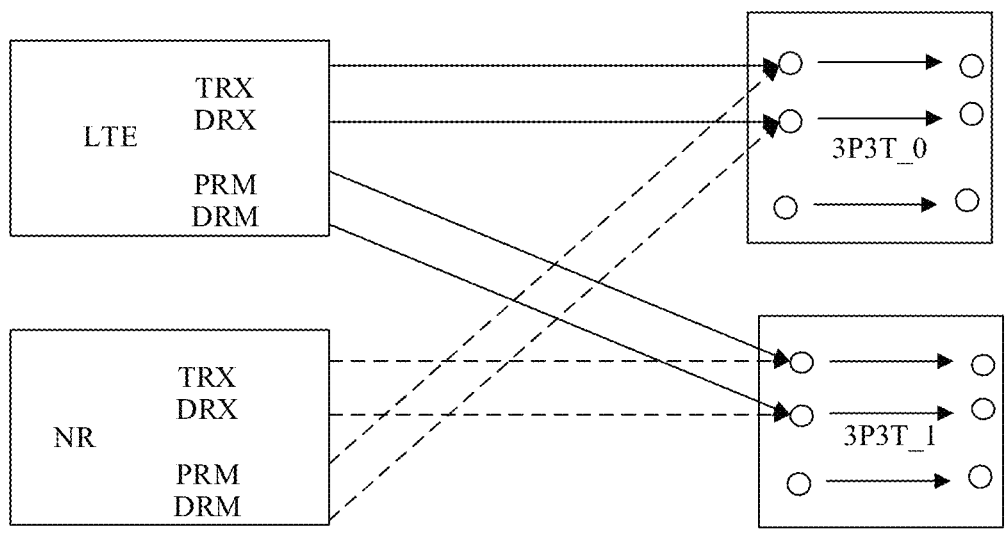
FIG. 5 is a schematic diagram illustrating that an RF channel of LTE and an RF channel of NR share a channel selector switch according to at least some embodiments.

As illustrated in FIG. 5, the RF channel of the LTE and the RF channel of the NR share two 3P3T switches, namely, 3P3T_0 and 3P3T_1, respectively.

Each 3P3T switch includes three P ports and three T ports. In the 3P3T switch, any P port is connected to any T port of the switch.

Regardless of the RF channel of the LTE or the RF channel of the NR, the first antenna group includes the TRX and DRX; and the second antenna group includes the PRM and DRM.

Referring to FIG. 6, one P port of the 3P3T_0 is connected to a T port of the 3P3T_1; and one T port of the 3P3T_0 is connected to a P port of the 3P3T_1. Under the evolved node B dual connectivity (ENDC) scenario, when the medium and high frequencies of LTE and the medium and high frequencies of NR are combined, and the 3P3T switch is shared, there may be a conflict in antenna switching between the LTE and NR, such as the antenna switching between the band B1 and the band N41. B1 and N41 are 4*4 MIMO respectively. The PRX and DRX in B1 are conflict with the PRM and DRXM in th N41. The PRX and DRX in N41 are conflict with the PRM and DRM in B1.

In the embodiment of the disclosure, through advancing in the policy for controlling the 3P3T switch, the antenna switching is optimized, and the throughput under the ENDC is improved.

First, a dummy antenna is provided. In the ENDC combination, the medium and high frequencies of the LTE and the medium and high frequencies of the NR share the 3P3T switch. Since the frequencies are close, the optimal antenna performances overlap. The LTE and the NR use different PAs, and the primary antenna and the diversity antenna of the LTE and the primary MIMO antenna and the diversity MIMO antenna of the NR share the same 3P3T switch. The primary antenna and the diversity antenna of the NR and the primary MIMO antenna and the diversity MIMO antenna of the LTE share the same 3P3T switch. As a result, the primary antenna and the diversity antenna of the LTE and the primary MIMO antenna and the diversity MIMO antenna of the NR have conflict control logic on the 3P3T switch; and the primary antenna and the diversity antenna of the NR and the primary MIMO antenna (PRM) and the diversity MIMO antenna (DRM) of the LTE have a conflict control logic on the 3P3T switch.

When the PRM and DRM of the LTE call the 3P3T, the control logic value written into the 3P3T is an invalid value, and completely follows the control logic for the TRX and DRX of the NR logically. When the PRM and DRM of the NR call the 3P3T, the control logic value written into the 3P3T is an invalid value, and ad completely follows the control logic for the TRX and DRX of the LTE logically.

Figure 7:
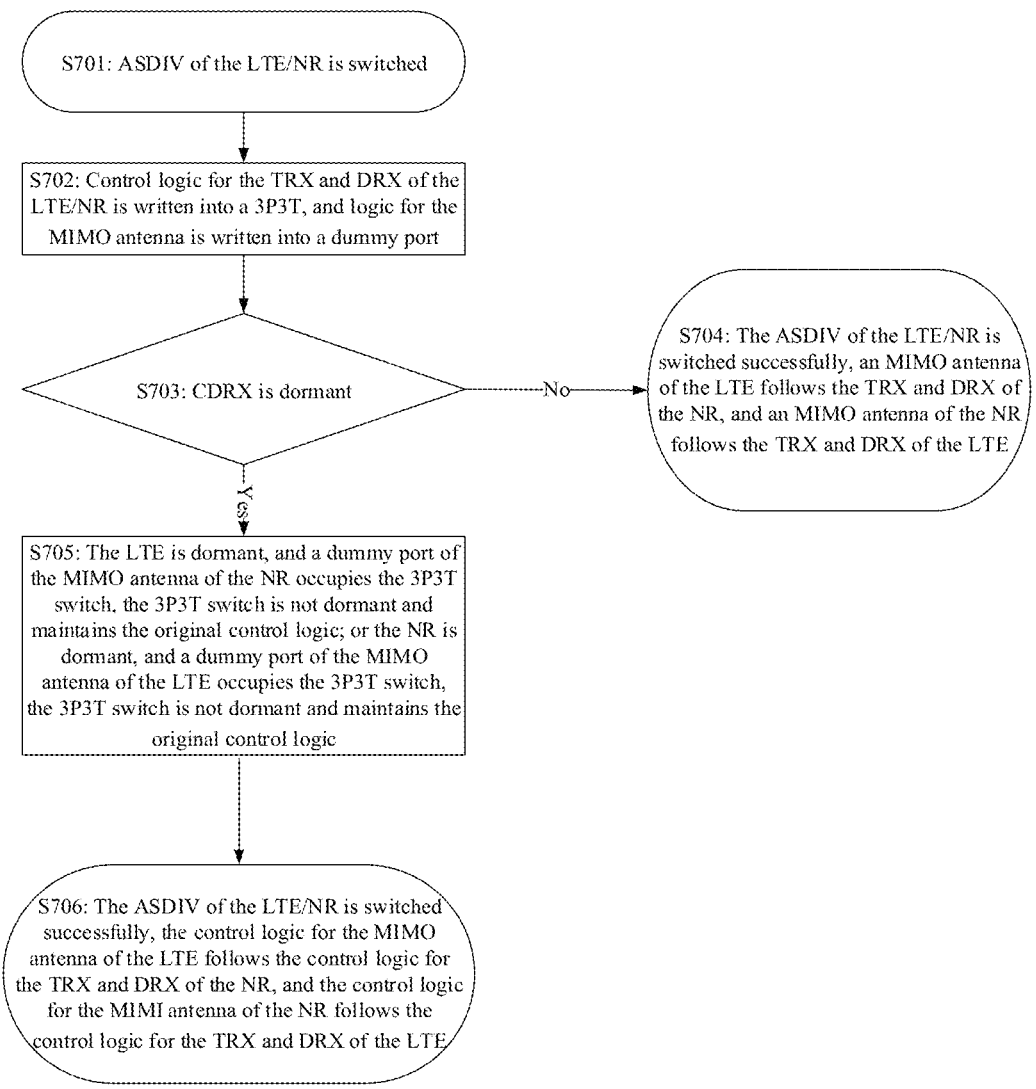
FIG. 7 is a flow chart illustrating a method for controlling a channel selector switch according to at least some embodiments.

The RF channels of the LTE communication system and the NR communication system share the same 3P3T switch. The 3P3T switch is one of the above-mentioned channel selector switches. The embodiment of the disclosure provides a method for controlling a 3P3T switch. As illustrated in FIG. 7, the method may include steps S701 to S706.

In S701, an antenna switched diversity (ASDIV) of the LTE/NR is switched.

In S702, a control logic for the TRX and DRX of the LTE/NR is written into a 3P3T, i.e., the logic is written according to the communication requirements for the TRX and DRX, which is equivalent to controlling the on-off state of the 3P3T; and according to an MIMO antenna, the logic is written into a dummy port.

In S703, it is determined whether a cycle of discontinuous reception (CDRX) is entered.

In S704, when the determination is negative, the ASDIV of the LTE/NR is switched successfully, and an RF channel corresponding to an MIMO antenna of the LTE follows an RF channel corresponding to the TRX and DRX of the NR.

In S705, when the determination is positive, the LTE is dormant, and a dummy port of the MIMO antenna of the NR occupies the 3P3T switch, i.e., the 3P3T switch is not dormant and maintains the original control logic; or the NR is dormant, and a dummy port of the MIMO antenna of the LTE occupies the 3P3T switch, i.e., the 3P3T switch is not dormant and maintains the original control logic.

In S706, the ASDIV of the LTE/NR is switched successfully, the control logic for the MIMO antenna of the LTE follows the control logic for the TRX and DRX of the NR, and the control logic for the MIMI antenna of the NR follows the control logic for the TRX and DRX of the LTE. All the control logic herein are the control logic for the 3P3T.

Figure 8A:
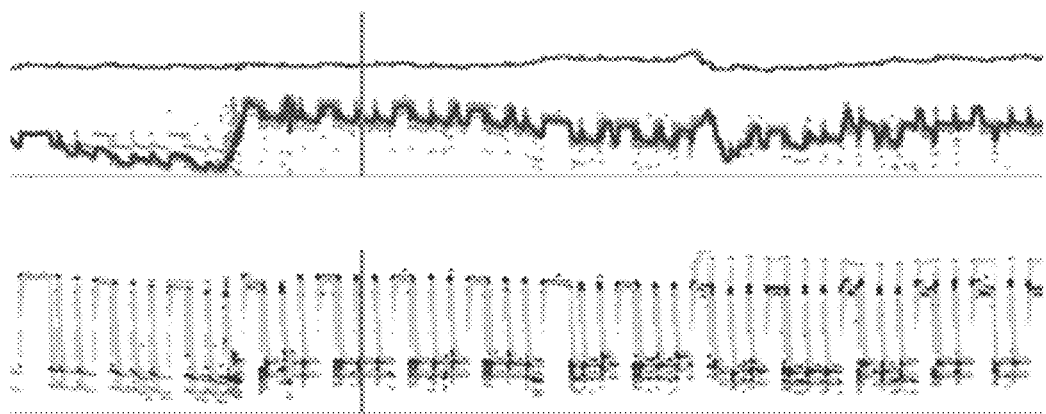
FIG. 8A is a simulation diagram of signal quality for an RF channel of an NR communication system when an RF channel of an LTE communication system is dormant and a channel selector switch is turned off.

FIG. 8A is a simulation diagram of signals received by two groups of antennas of the NR after the LTE is dormant and the 3P3T switch is dormant consequently, in a case that an RF channel of the LTE and an RF channel of the NR share a 3P3T switch. In FIG. 8A, the horizontal axis is the time, and the longitudinal axis is the received signal strength indication (RSSI). As may be seen from FIG. 8A, there are huge differences in the RSSI oscillograms for four antennas included in two groups of antennas of the NR. A oscillogram tends to be a straight line, i.e., no signal is received, and a oscillogram jumps up and down, i.e., no useful signal is received. Therefore, while the LTE is dormant, the dormant 3P3T has a negative effect on the wireless communication of the NR.

Figure 8B:
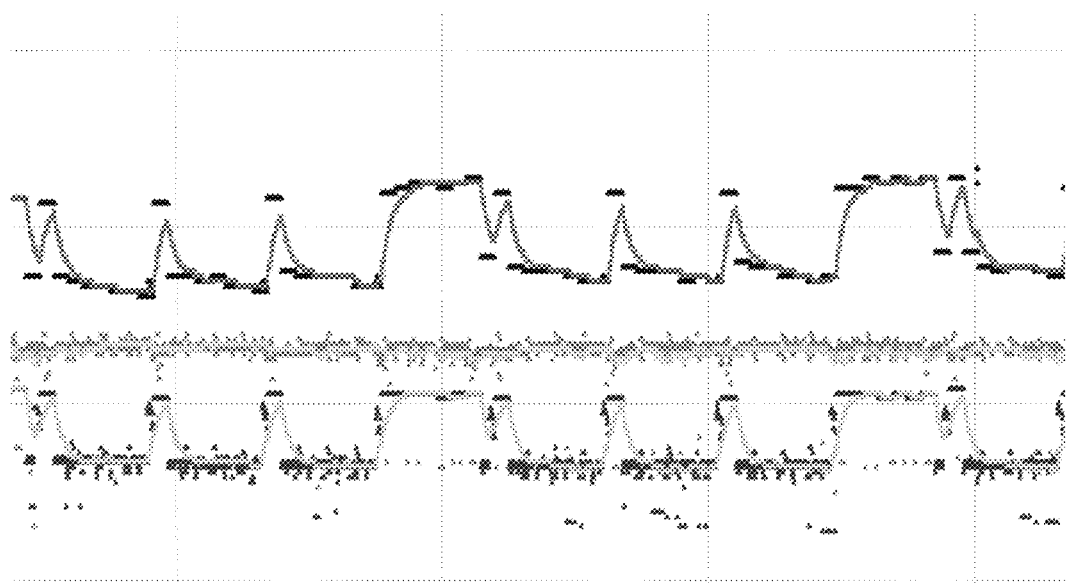
FIG. 8B is a simulation diagram of signal quality for an RF channel of an NR communication system when an RF channel of an LTE communication system is dormant and a channel selector switch is turned off according to at least some embodiments.

In FIG. 8B, with the solution provided in the embodiment of the disclosure, while the communication link of the LTE is dormant, the 3P3T switch is not dormant. In this case, the RSSI oscillograms of signals received by the four antennas included in the two groups of antennas of the NR are similar, thereby achieving a good diversity gain and ensuring the communication quality of the NR.

Figure 9:
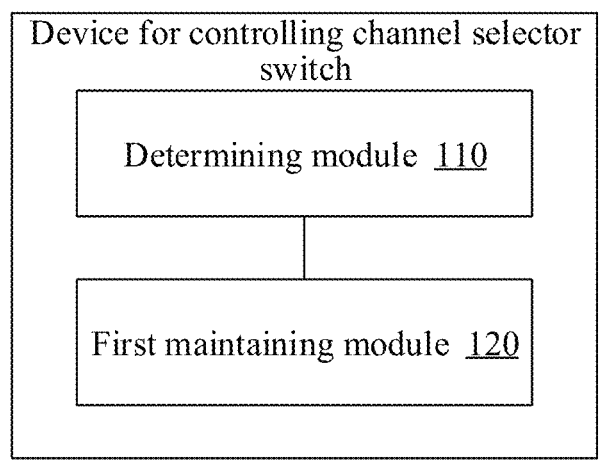
FIG. 9 is a structural diagram illustrating a device for controlling a channel selector switch according to at least some embodiments.

As illustrated in FIG. 9, the embodiments of the disclosure provide a device for controlling a channel selector switch. The device is applied to a terminal having at least two RF channels. The at least two RF channels share the channel selector switch. The device includes a determining module 110 and a first maintaining module 120.

The determining module 110 is configured to determine a state of each of a first RF channel and a second RF channel that share a same channel selector switch.

The first maintaining module 120 is configured to maintain, in response to that the first RF channel is to enter a dormant state and the second RF channel is in an activated state, an active state of the channel selector switch.

In some embodiments, the determining module 110 and the first maintaining module 120 include a program module. The program module may implement, after executed by a processor, acquisition of user situation information, determination of a working mode and control on air conditioner operation.

In another embodiment, the determining module 110 and the first maintaining module 120 include a module combining hardware and software. The module combining hardware and software includes but is not limited a programmable array. The programmable array includes but is not limited to a complex programmable array and/or a field programmable array.

The first maintaining module 120 is configured to determine, in response to that the first RF channel is to enter the dormant state and the second RF channel is in the activated state, whether the channel selector switch is occupied by the second RF channel of the at least two RF channels; and maintain, when the channel selector switch is occupied by the second RF channel, the active state of the channel selector switch.

In some embodiments, the device further includes a first control module.

The first control module is configured to control a part of the first RF channel other than the channel selector switch to enter the dormant state while maintaining the channel selector switch in the active state.

In some embodiments, the device may further include a second maintaining module or a second control module.

The second maintaining module is configured to maintain an on-off state of the channel selector switch while maintaining the active state of the channel selector switch.

The second control module is configured to control an on-off state of the channel selector switch according to a communication requirement for the second RF channel while maintaining the active state of the channel selector switch.

In some embodiments, the second control module is specifically configured to acquire a first logic value while maintaining the active state of the channel selector switch, wherein the first logic value is determined according to a communication requirement for an RF channel to which a second antenna group connected to the channel selector switch belongs; and control the on-off state of the channel selector switch according to the first logic value after the first RF channel enters the dormant state.

In some embodiments, either of the at least two RF channels has a first antenna group and a second antenna group, wherein the second antenna group is an auxiliary antenna group for the first antenna group; and a first antenna group in any RF channel of the at least two RF channels and a second antenna group in other RF channel of the at least two RF channels share one channel selector switch.

In some embodiments, the device further includes a third control module.

The third control module is configured to control, in response to that both RF channels sharing the same channel selector switch are in the activated state, the on-off state of the channel selector switch according to a communication requirement for an RF channel to which the first antenna group connected to the channel selector switch belongs.

In some embodiments, the third control module is configured to acquire a second logic value, wherein the second logic value is determined according to the communication requirement for the RF channel to which the first antenna group connected to the channel selector switch belongs; and control the on-off state of the channel selector switch according to the second logic value.

In some embodiments, when the first RF channel is an RF channel which supports Long Term Evolution (LTE) communication, the second RF channel is an RF channel which supports New Radio (NR) communication; or when the first RF channel is the RF channel which supports the NR communication, the second RF channel is the RF channel which supports the LTE communication.

The embodiment of the disclosure provides a terminal. The terminal includes a memory and a processor.

The memory is configured to store an instruction executable by the processor.

The processor is connected to the memory.

The processor is configured to perform the method for controlling a channel selector switch provided in any one of the forgoing technical solutions.

The processor may include various types of storage mediums. The storage mediums are non-transitory computer storage mediums which may continuously memorize the information stored thereon after the communication device is powered off.

Herein, the terminal may include: a mobile terminal which may be used as a terminal, such as an air conditioner, or a remote control panel or the air conditioner or a mobile phone.

The processor may be connected to the memory via bus or the like, and configured to read an executable program stored on the memory. For example, the processor may execute at least one of any methods illustrated in FIG. 1, FIG. 3, FIG. 4 and FIG. 7.

Figure 10:
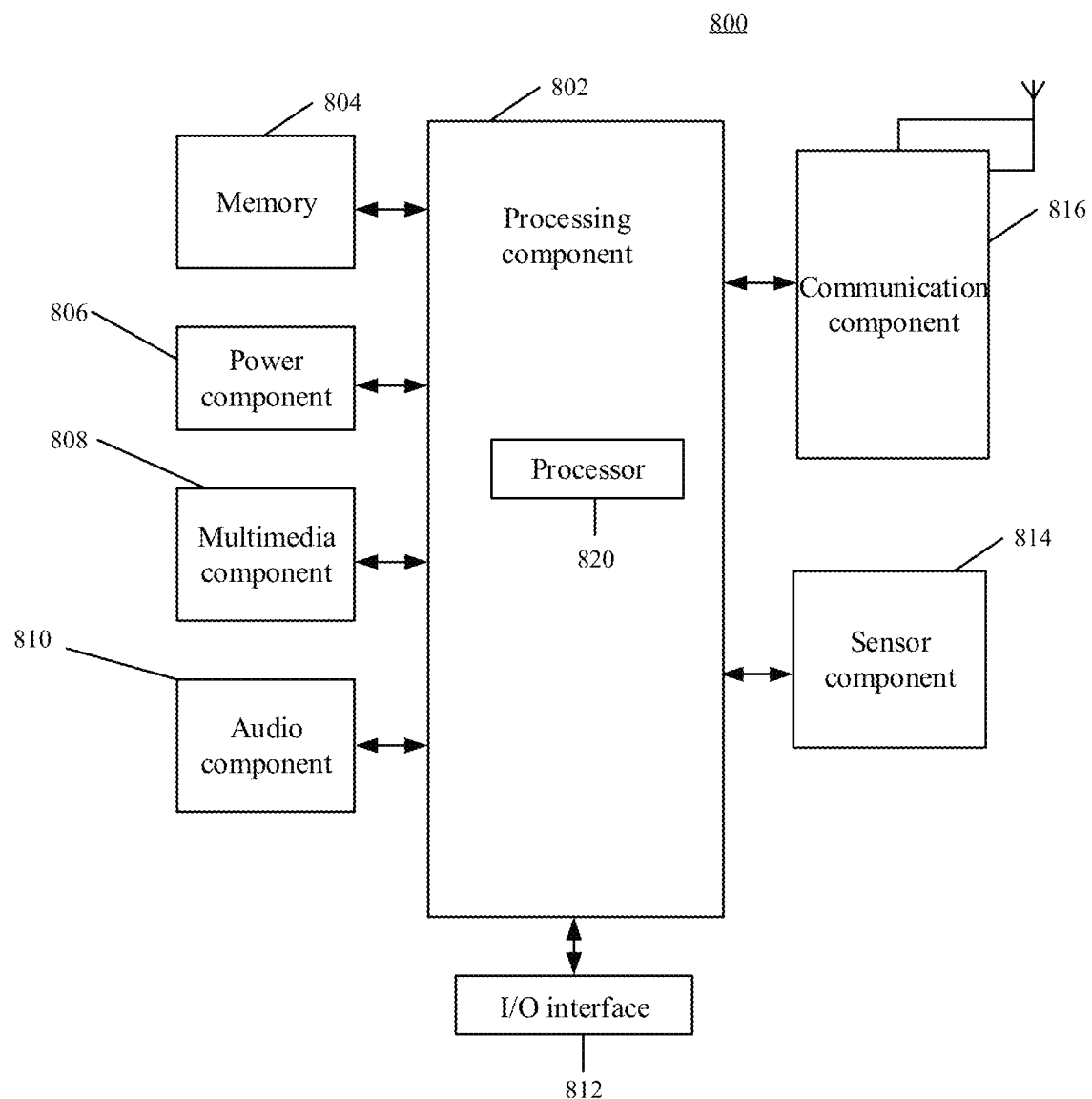
FIG. 10 is a structural diagram illustrating a terminal according to at least some embodiments.

FIG. 10 is a structural diagram illustrating a mobile terminal 800 according to at least some embodiments. For example, the mobile terminal 800 may be a mobile phone, a mobile computer, etc.

Referring to FIG. 10, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps of the above described methods. Moreover, the processing component 802 may include one or more modules which facilitate the interactions between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any application or method operated on the terminal 800, contact data, phonebook data, messages, pictures, videos, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). When the screen includes the TP, the screen may be implemented as a touch screen to receive an input signal from the user. The TP includes one or more touch sensors to sense touches, slides and gestures on the TP. The touch sensors may not only sense a boundary of a touch or slide, but also sense a duration and a pressure associated with the touch or slide. In some embodiments, the multimedia component 808 includes a front camera and/or a rear camera. The front camera and/or the rear camera may receive external multimedia data when the device 800 is in an operation mode, such as a shooting mode or a video mode. Each of the front camera and the rear camera may be a fixed optical lens system or have a focus and an optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may further be stored in the memory 804 or transmitted via the communication component 816. In some embodiments, the audio component 810 further includes a speaker configured to output audio signals.

The I/O interface 812 provides an interface between the processing component 802 and peripheral interface modules. The peripheral interface modules may be a keyboard, a click wheel, buttons, or the like. The buttons may include, but are not limited to, a home button, a volume button, a start button, or a lock button.

The sensor component 814 includes one or more sensors to provide state assessments on various aspects of the terminal 800. For instance, the sensor component 814 may detect an open/closed state of the device 800, relative positioning of components such as the display and the keypad of the terminal 800, a change in position of the terminal 800 or a change in position of a component of the terminal 800, presence or absence of user contact with the terminal 800, an orientation or an acceleration/deceleration of the terminal 800, or a change in temperature of the terminal 800. The sensor component 814 may include a proximity sensor configured to detect the presence of nearby objects without any physical contact. The sensor component 814 may further include a light sensor, such as a complementary metal oxide semiconductor (CMOS) or charge coupled device (CCD) image sensor configured for use in an imaging application. In some embodiments, the sensor component 814 may further include an accelerometer sensor, a gyroscope sensor, a magnetic sensor, a pressure sensor, or a temperature sensor.

The communication component 816 is configured to facilitate the wired or wireless communications between the terminal 800 and other devices. The terminal 800 may access a wireless network based on a communication standard, such as WiFi, 2G, or 3G, or a combination thereof. In at least some embodiments, the communication component 816 receives a broadcast signal or broadcast associated information from an external broadcast management system via a broadcast channel. In at least some embodiments, the communication component 816 further includes a near field communication (NFC) module to facilitate the short-range communications. For example, the NFC module may be implemented based on a radio frequency identification (RFID) technology, an infrared data association (IrDA) technology, an ultra-wideband (UWB) technology, a bluetooth (BT) technology, or other technologies.

In at least some embodiments, the terminal 800 may be implemented with one or more application specific integrated circuit (ASIC), digital signal processor (DSP), digital signal processing device (DSPD), programmable logic device (PLD), field programmable gate array (FPGA), controller, microcontroller, microprocessor, or other electronic components, for performing the above described methods.

In at least some embodiments, a non-transitory computer-readable storage medium including an instruction is further provided. For example, the memory 804 including an instruction executed by the processor 820 of the terminal 800 to complete the above-mentioned method. For example, the non-transitory computer-readable storage medium may be a read only memory (ROM), a random access memory (RAM), a compact disc read-only memory (CD-ROM), a magnetic tape, a floppy disc, an optical data storage device or the like.

The embodiments of the disclosure provide a non-transitory computer-readable storage medium; and an instruction in the storage medium causes, when executed by a processor of a terminal, the terminal to execute the method for controlling the channel selector switch provided by the above any embodiment, for example, may execute at least one of the methods illustrated in FIG. 1, FIG. 3, FIG. 4 and FIG. 7.

The method for controlling a channel selector switch includes: determining a state of each of a first RF channel and a second RF channel that share a same channel selector switch; and maintaining, in response to that the first RF channel is to enter a dormant state and the second RF channel is in an activated state, an active state of the channel selector switch.

It is to be understood that, maintaining, in response to that the first RF channel is to enter the dormant state and the second RF channel is in the activated state, the active state of the channel selector switch includes:

determining, in response to that the first RF channel is to enter the dormant state and the second RF channel is in the activated state, whether the channel selector switch is occupied by the second RF channel of the at least two RF channels; and maintaining, when the channel selector switch is occupied by the second RF channel, the active state of the channel selector switch.

It is to be understood that, the method further includes: controlling a part of the first RF channel other than the channel selector switch to enter the dormant state while maintaining the channel selector switch in the active state.

It is to be understood that, the method further includes: maintaining an on-off state of the channel selector switch while maintaining the active state of the channel selector switch; or controlling an on-off state of the channel selector switch according to a communication requirement for the second RF channel while maintaining the active state of the channel selector switch.

It is to be understood that, controlling the on-off state of the channel selector switch according to the communication requirement for the second RF channel while maintaining the active state of the channel selector switch includes:

acquiring a first logic value while maintaining the active state of the channel selector switch, wherein the first logic value is determined according to a communication requirement for an RF channel to which a second antenna group connected to the channel selector switch belongs; and controlling the on-off state of the channel selector switch according to the first logic value after the first RF channel enters the dormant state.

It is to be understood that, either of the at least two RF channels has a first antenna group and a second antenna group, wherein the second antenna group is an auxiliary antenna group for the first antenna group; and a first antenna group in any RF channel of the at least two RF channels and a second antenna group in other RF channel of the at least two RF channels share one channel selector switch.

It is to be understood that, the method further includes: controlling, in response to that both RF channels sharing the same channel selector switch are in the activated state, the on-off state of the channel selector switch according to a communication requirement for an RF channel to which the first antenna group connected to the channel selector switch belongs.

It is to be understood that, controlling, in response to that both RF channels sharing the same channel selector switch are in the activated state, the on-off state of the channel selector switch according to the communication requirement for the RF channel to which the first antenna group connected to the channel selector switch belongs includes: acquiring a second logic value, wherein the second logic value is determined according to the communication requirement for the RF channel to which the first antenna group connected to the channel selector switch belongs; and controlling the on-off state of the channel selector switch according to the second logic value.

It is to be understood that, when the first RF channel is an RF channel which supports Long Term Evolution (LTE) communication, the second RF channel is an RF channel which supports New Radio (NR) communication; or when the first RF channel is the RF channel which supports the NR communication, the second RF channel is the RF channel which supports the LTE communication.

Other embodiments of the disclosure are apparent to those skilled in the art in consideration of the specification together with the practice of the disclosure here. The disclosure is intended to cover any variations, usages, or adaptations of the disclosure following the general principles thereof and including common knowledge in the art or common technical measures in the art which are undisclosed in the disclosure. It is intended that the specification and embodiments are for illustration only, and the true scope and spirit of the disclosure is indicated by the following claims.

It is to be understood that the disclosure is not limited to the exact structure described above and illustrated in the accompanying drawings, and various modifications and changes may be made without departing from the scope thereof. It is intended that the scope of the disclosure only be limited by the appended claims.

What is claimed is:

1. A method for controlling a channel selector switch, comprising:
   determining, by a terminal comprising a first Radio Frequency (RF) channel and a second RF channel, a state of each of the first RF channel and the second RF channel that share the channel selector switch;
   maintaining, in response to the first RF channel being to enter a dormant state and the second RF channel being in an activated state, an active state of the channel selector switch; and
   controlling a part of the first RF channel other than the channel selector switch to enter the dormant state while maintaining the channel selector switch in the active state.

2. The method of claim 1, further comprising:
   maintaining a state of the channel selector switch while maintaining the active state of the channel selector switch, wherein the state of the channel selector switch is an on state or an off state; or
   controlling the state of the channel selector switch according to a communication requirement for the second RF channel while maintaining the active state of the channel selector switch;
   wherein when the first RF channel is to enter the dormant state and the second RF channel is in the activated state, under different states, the channel selector switch turns on different RF links in the second RF channel;
   wherein the communication requirement is a requirement allowing the second RF channel in the activated state to perform work.

3. The method of claim 2, wherein controlling the state of the channel selector switch according to the communication requirement for the second RF channel while maintaining the active state of the channel selector switch comprises:
   acquiring a first logic value for controlling the state of the channel selector switch while maintaining the active state of the channel selector switch, wherein the first logic value is determined according to a communication requirement for an RF channel to which a second antenna group connected to the channel selector switch belongs; and
   controlling the state of the channel selector switch according to the first logic value after the first RF channel enters the dormant state.

4. The method of claim 1, wherein either of the first RF channel and the second RF channel has a first antenna group and a second antenna group, the second antenna group is an auxiliary antenna group for the first antenna group; and a first antenna group in one of RF channel of the first RF channel and the second RF channel and a second antenna group in another RF channel of the first RF channel and the second RF channel share one channel selector switch.

5. The method of claim 4, further comprising:
   controlling, in response to both RF channels sharing the channel selector switch being in the activated state, a state of the channel selector switch according to a communication requirement for an RF channel to which the first antenna group connected to the channel selector switch belongs, wherein the state of the channel selector switch is an on state or an off state;
   wherein when the first RF channel is to enter the dormant state and the second RF channel is in the activated state, under different states, the channel selector switch turns on different RF links in the second RF channel;
   wherein the communication requirement is a requirement allowing the second RF channel in the activated state to perform work.

6. The method of claim 5, wherein controlling, in response to both RF channels sharing the channel selector switch being in the activated state, the state of the channel selector switch according to the communication requirement for the RF channel to which the first antenna group connected to the channel selector switch belongs comprises:
   acquiring a second logic value for controlling the state of the channel selector switch, wherein the second logic value is determined according to the communication requirement for the RF channel to which the first antenna group connected to the channel selector switch belongs; and
   controlling the state of the channel selector switch according to the second logic value.

7. The method of claim 1, wherein
   when the first RF channel is an RF channel which supports Long Term Evolution (LTE) communication, the second RF channel is an RF channel which supports New Radio (NR) communication; or when the first RF channel is the RF channel which supports the NR communication, the second RF channel is the RF channel which supports the LTE communication.

8. The method of claim 1, wherein maintaining, in response to the first RF channel being to enter the dormant state and the second RF channel being in the activated state, the active state of the channel selector switch comprises:
   determining, in response to the first RF channel being to enter the dormant state and the second RF channel being in the activated state, whether the channel selector switch is occupied by the second RF channel; and
   maintaining, when the channel selector switch is occupied by the second RF channel, the active state of the channel selector switch.

9. A device for controlling a channel selector switch, applied to a terminal having a first radio frequency (RF) channel and a second RF channel sharing a channel selector switch, the device comprising:
   a processor; and
   a memory for storing executable instructions;
   wherein the processor is configured to execute the instructions to:
   determine a state of each of the first RF channel and the second RF channel that share the channel selector switch;
   maintain, in response to the first RF channel being to enter a dormant state and the second RF channel being in an activated state, an active state of the channel selector switch; and
   control a part of the first RF channel other than the channel selector switch to enter the dormant state while maintaining the channel selector switch in the active state.

10. The device of claim 9, wherein the processor is further configured to execute the instructions to:
- maintain a state of the channel selector switch while maintaining the active state of the channel selector switch, wherein the state of the channel selector switch is an on state or an off state; or
- control the state of the channel selector switch according to a communication requirement for the second RF channel while maintaining the active state of the channel selector switch;
- wherein when the first RF channel is to enter the dormant state and the second RF channel is in the activated state, under different states, the channel selector switch turns on different RF links in the second RF channel;
- wherein the communication requirement is a requirement allowing the second RF channel in the activated state to perform work.

11. The device of claim 10, wherein the processor is further configured to execute the instructions to acquire a first logic value for controlling the state of the channel selector switch while maintaining the active state of the channel selector switch, the first logic value being determined according to a communication requirement for an RF channel to which a second antenna group connected to the channel selector switch belongs; and control the state of the channel selector switch according to the first logic value after the first channel enters the dormant state.

12. The device of claim 9, wherein either of the first RF channel and the second RF channel has a first antenna group and a second antenna group, the second antenna group is an auxiliary antenna group for the first antenna group; and a first antenna group in one of RF channel of the first RF channel and the second RF channel and a second antenna group in another RF channel of the first RF channel and the second RF channel share one channel selector switch.

13. The device of claim 12, wherein the processor is further configured to execute the instructions to:
- control, in response to both RF channels sharing the same channel selector switch being in the activated state, a state of the channel selector switch according to a communication requirement for an RF channel to which the first antenna group connected to the channel selector switch belongs, wherein the state of the channel selector switch is an on state or an off state;
- wherein when the first RF channel is to enter the dormant state and the second RF channel is in the activated state, under different states, the channel selector switch turns on different RF links in the second RF channel;
- wherein the communication requirement is a requirement allowing the second RF channel in the activated state to perform work.

14. The device of claim 12, wherein the processor is further configured to execute the instructions to acquire a second logic value for controlling the state of the channel selector switch, the second logic value being determined according to the communication requirement for the RF channel to which the first antenna group connected to the channel selector switch belongs; and control the state of the channel selector switch according to the second logic value.

15. The device of claim 9, wherein
- when the first RF channel is an RF channel which supports Long Term Evolution (LTE) communication, the second RF channel is an RF channel which supports New Radio (NR) communication; or when the first RF channel is the RF channel which supports the NR communication, the second RF channel is the RF channel which supports the LTE communication.

16. The device of claim 9, wherein the processor is further configured to execute the instructions to:
- determine, in response to the first RF channel being to enter a dormant state and the second RF channel being in an activated state, whether the channel selector switch is occupied by the second RF channel; and
- maintain, when the channel selector switch is occupied by the second RF channel, an active state of the channel selector switch.

17. A non-transitory computer-readable storage medium having stored thereon instructions that when executed by a processor of a computer, cause the computer to perform a method for controlling the channel selector switch, the method comprising:
- determining a state of each of a first RF channel and a second RF channel that share a same channel selector switch;
- maintaining, in response to the first RF channel being to enter a dormant state and the second RF channel being in an activated state, an active state of the channel selector switch; and
- controlling a part of the first RF channel other than the channel selector switch to enter the dormant state while maintaining the channel selector switch in the active state.

18. The storage medium of claim 17, wherein maintaining, in response to the first RF channel being to enter the dormant state and the second RF channel being in the activated state, the active state of the channel selector switch comprises:
- determining, in response to the first RF channel being to enter the dormant state and the second RF channel being in the activated state, whether the channel selector switch is occupied by the second RF channel; and
- maintaining, when the channel selector switch is occupied by the second RF channel, the active state of the channel selector switch.

* * * * *